United States Patent [19]

Mizukoshi

[11] Patent Number: 4,978,325
[45] Date of Patent: Dec. 18, 1990

[54] TRIPOD TYPE CONSTANT VELOCITY JOINT

[75] Inventor: Yasumasa Mizukoshi, Fujisawa, Japan

[73] Assignee: Nippon Seiko Kabushiki Kaisha, Tokyo, Japan

[21] Appl. No.: 386,014

[22] Filed: Jul. 26, 1989

Related U.S. Application Data

[63] Continuation of Ser. No. 323,073, Mar. 10, 1989, abandoned, which is a continuation of Ser. No. 129,858, Dec. 4, 1987, abandoned, which is a continuation-in-part of Ser. No. 896,671, Aug. 14, 1986, abandoned.

[30] Foreign Application Priority Data

Sep. 2, 1985 [JP] Japan .................................. 60-133065

[51] Int. Cl.$^5$ .................................................. F16D 3/205
[52] U.S. Cl. ...................................... 464/111; 464/905
[58] Field of Search ....................... 464/7, 11, 111, 122, 464/123, 124, 905

[56] References Cited

U.S. PATENT DOCUMENTS

| | | | |
|---|---|---|---|
| 1,885,646 | 11/1932 | Warner | 464/11 |
| 2,595,513 | 5/1952 | Cureton | 464/7 |
| 2,722,115 | 11/1955 | Dunn | 464/124 |
| 2,926,510 | 3/1960 | De Lorean | 464/123 |
| 3,120,746 | 2/1964 | Kayser | 464/7 |
| 4,167,860 | 9/1979 | Sakaguchi et al. | 464/111 |
| 4,192,154 | 3/1980 | Nakamura et al. | 464/111 |
| 4,582,502 | 4/1986 | Girguis | 464/111 |

FOREIGN PATENT DOCUMENTS

| | | | |
|---|---|---|---|
| 113822 | 6/1985 | Japan | 464/7 |
| 903609 | 2/1982 | U.S.S.R. | 464/11 |
| 2117088 | 10/1983 | United Kingdom | 464/11 |

Primary Examiner—Daniel P. Stodola
Attorney, Agent, or Firm—Rosen, Dainow & Jacobs

[57] ABSTRACT

A constant velocity joint of the tripod type comprises: three raceways in a housing, and three cylindrial rollers mounted movably on each of three trunnions mounted on a shaft. Three U-shaped aligning members are each disposed between the raceway and the cylindrical roller in such a way that the member pinches the cylindrical roller. The aligning member has a contact surface with the raceway as a cylindrical surface, is held in the housing, relatively movable to the raceway having the contact surface with the cylindrical roller as a plane, the plane functioning as a rolling plane of the cylindrical roller. A groove is provided on the surface inside the aligning member or in the central part of the width direction of the surface of the cylindrical roller, forming contact areas with the cylindrical roller and the aligning member on both sides of the groove, and reducing the influence of rolling friction resistance force of the cylindrical roller to an axial force.

7 Claims, 4 Drawing Sheets

Prior art

TRIPOD TYPE CONSTANT VELOCITY JOINT

This application is a continuation of application Ser. No. 323,073, filed Mar. 10, 1989, now abandoned which is a continuation of application of application Ser. No. 129,858, filed Dec. 4, 1987, now abandoned which is a continuation-in-part, of application Ser. No. 896,671, filed 8/14/86, now abandoned.

BACKGROUND OF THE INVENTION

This invention relates to an improvement of tripod type constant velocity joints.

In a conventional tripod type constant velocity joint which generally has been used, it is known that said tripod type constant velocity joint receives axial forces, three times per one revolution in its rotation with a torque when operated in certain angle.

Due to fluctuation of the axial force by the extent of joint angle, transmitting torque, etc., particularly in a recent high powered vehicle, the fluctuation of said axial force is likely to become larger or increase. Further, in the cases that the occurence cycle of axial force corresponds to that of the proper frequency of a vehicle body, vehicle suspension and the like, and the axial force is strong enough to induce co-vibration of the vehicle, there is the convenient problem that a crew in a vehicle feesl uncomfortable lateral shaking.

To solve such an inconvenient problem, a proposal has been made in the U.S. patent application No. 06/750,590 by this applicant.

The constant velocity joint relating to this proposal as shown in FIG. 3 and FIG. 4 consists of U-shaped aligning means disposed between three raceways 1 in a housing H and three cylindrical rollers R in such way that said aligning means fitting into raceways 1 pinch the cylindrical rollers, each of which is mounted movably on a trunnion 2 provided on a shaft. The aligning member means U has, as its contact surface with a cylindrical surface $r^1$ of the raceway 1, a continuous or discontinuous cylindrical surface $r^2$, The aligning member means U is axially maintained within the housing H at one end by support tabs at the open end of the raceways 1 so that said aligning member means U is movable relatively in the raceway, and has a flat plane P on the inner side surface contacting with surface of the cylindrical roller R. The cylindrical roller R rolls on said flat plane P, to thus reduce the axial force. Further, in the drawing, 3 indicates a needle, and 4 indicates striker ring fixed to stop ring 5 which corresponds to element 15 of FIG. 28 of said 06/750,590 copending application.

However, since the aligning member means used here is formed from drawn steel material and heat treated to improve the durability, it has been unavoidable to have manufacturing errors or heat treating distortions caused in such processes and to have discontinuous or partial line contacts different from the ideally continuous line contacts between a cylindrical roller R and a plane P of the aligning member means U.

Accordingly, there remained an inconvenient problem that the axial force caused by a rolling friction resistance force of the cylindrical roller R between the cylindrical roller R and the aligning member means U and causing the shaking of a vehicle is not reduced sufficiently.

The following is the result of the cause analysis of the above operation:

Now, the drawing in FIG. 5 indicates mutual relations of sliding and rolling forces which occur in the state of contact or in the contact part the cylindrical roller R contacting the flat plane P in their exact dimensions.

Further in the invention, as explained later, since the purpose of this invention is to reduce the axial force by analyzing a friction resistance force in the rolling movement of the cylindrical roller R on the flat plane P, other forces are disregarded here.

In the drawing, O is the joint center, $\theta$ is a joint angle, $OY^1$ is center line of a trunnion in the joint angle $\theta$, $OY^2$ is the centerline of the trunnion in the case of joint angle zero only assumed on this drawing. A,B,C are three optional spots having each load on the contact part (line) $OY^1$ of the cylindrical roller R contacting the plane P.

When the axis of cylindrical roller R moves to the direction from $OY^1$ to $OY^2$, B becomes a spot to show the pure rolling movement and A and C become highest in sliding movements and both A and C work in the opposite direction each other. fA, fB, fC are friction resistance forces which work on the cylindrical roller at said spots A, B and C. fA and fC occur due to a sliding movement, fB occurs due to a friction force between the cylindrical roller R and the trunnion 2, and friction etc. between the cylindrical roller and the striker ring 4, each works to the directions shown by each arrow mark. $f^1$ and $f^0$ are forces which occur at the center of the joint and affect the axial force, and $f^1$ is a rolling friction resistance force which affects on the axial force caused by fB and it can be f1=fB, $f^0$ is an counter force which occurs by fA and fC, and can be calculated as follows. That is, OB=lb and AC=L1 (almost same as the width of aligning member means) are given, suppose fA=fC is assumed in order to make a calculation easy, fo .fb=fA .l1 will be fo=l1/lb×fA. By this analysis, it can be seen that fo and $f^1$ are in the opposite direction to one another and fA and fC caused by the sliding movement are effective in reducing the axial force.

However, since there are some manufacturing errors or heat treating distortions caused by heat treatment as explained previously, any sliding movement does not happen without contacts at spots A and C for the reason mentioned previously and due to only partial contact at B or in its vicinity only a rolling friction resistance force of the cylindrical roller occurred in the actual practice. Accordingly $f^1$ remained there as an axial force and caused every kind of vibrations.

SUMMARY OF THE INVENTION

As such analysis, a general object of this invention is to decrease the influence of rolling friction resistance force $f^1$ of a cylindrical roller to the axial force by positively having sliding movement occur even the case that the U shaped aligning member means has some manufacturing errors or heat treatment distortions.

The tripod type constant velocity joint of this invention is comprised of three race ways on a housing and three U-shaped aligning member means, each of which is disposed between the raceway and a cylindrical roller mounted moveably on a trunnion mounted on a shaft in such way that said means pinches cylindrical roller, and the aligning member means having a contact surface with said cylindrical roller as a cylindrical surface, being axially maintained within the housing and relatively movable in said raceway, having the contact surface with said cylindrical roller as a flat plane, and having said plane as a rolling plane of the cylindrical roller, and being characterized in providing a groove on the plane of the aligning member means or in the central part of the width direction of the plane of said cylindrical roller, and forming contact parts with either cylindrical roller or aligning member means on both sides of said groove.

In this invention, a groove is provided in the plane of the aligning member means or in the central part of the periphery of the cylindrical roller. Two separate planes or two separate peripheries produced by the groove are formed in parallel in both marginal areas of the width direction, and said surfaces consist the contact area with the cylindrical roller or aligning member means.

Accordingly, even in the case that there are some manufacturing errors or heat treatment distortions in the aligning member means, it is possible to keep always the peripheral surface of the cylidrical roller in contact with said two separate planes or two separate peripheral surfaces in contact with the plane of the aligning member means. Further, since sliding motions are large in the contact areas between this peripheral surface and said two separate planes or said two separate peripheral surfaces and the flat planes, the friction resistance force by the sliding motions will occur in these areas.

For this reason, explaining in reference to FIG. 5, fo at the center O of the joint created by said friction resistance working in the opposite direction of the rolling friction resistance force $f^1$ reduces this force. As the results, the influence of the rolling friction resistance force $f^1$ to the axial force is to decrease.

BRIEF DESCRIPTION OF THE ACCOMPANYING DRAWINGS

DETAILED DESCRIPTION OF PREFERRED EMBODIMENTS

Figure 1:
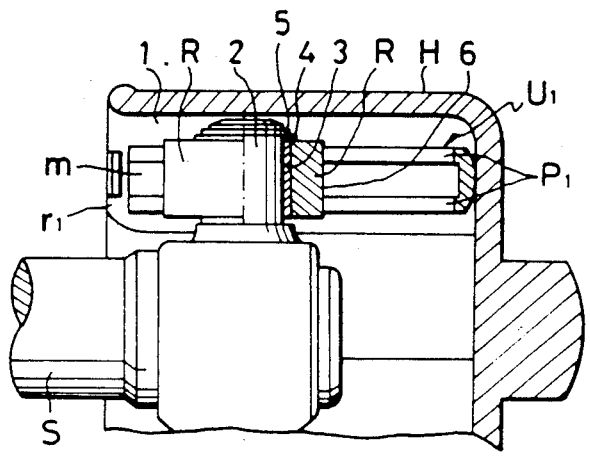
FIG. 1 is a section view of the first embodiment of this invention.
Figure 2A:
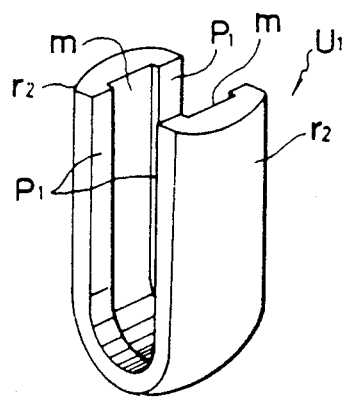
FIG. 2A is a perspective view of the aligning member means shown in FIG. 1.
Figure 2B:
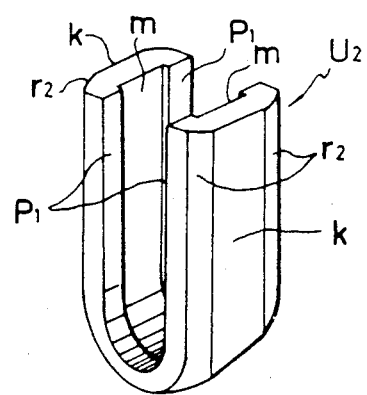
FIG. 2B is a perspective view of another embodiment of the aligning member means.

FIG. 1 and FIG. 2A indicate the first embodiments of this invention. FIG. 2B indicates another embodiment of aligning member means of this invention.

Figure 3:
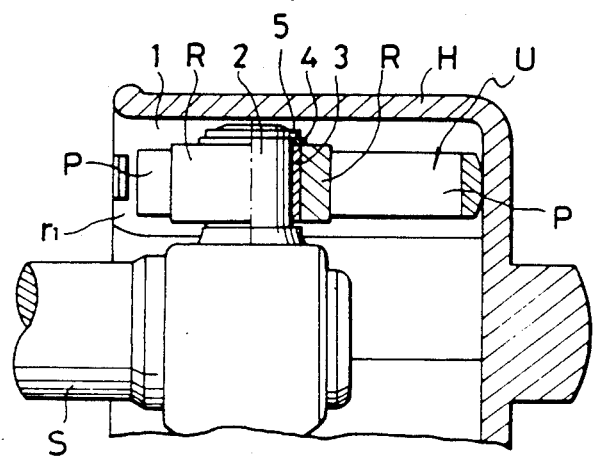
FIG. 3 is a section view of a conventional tripod type constant velocity joint.
Figure 4:
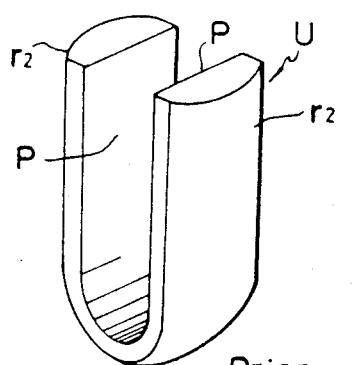
FIG. 4 is a perspective view of the aligning member means shown in FIG. 3.
Figure 5:
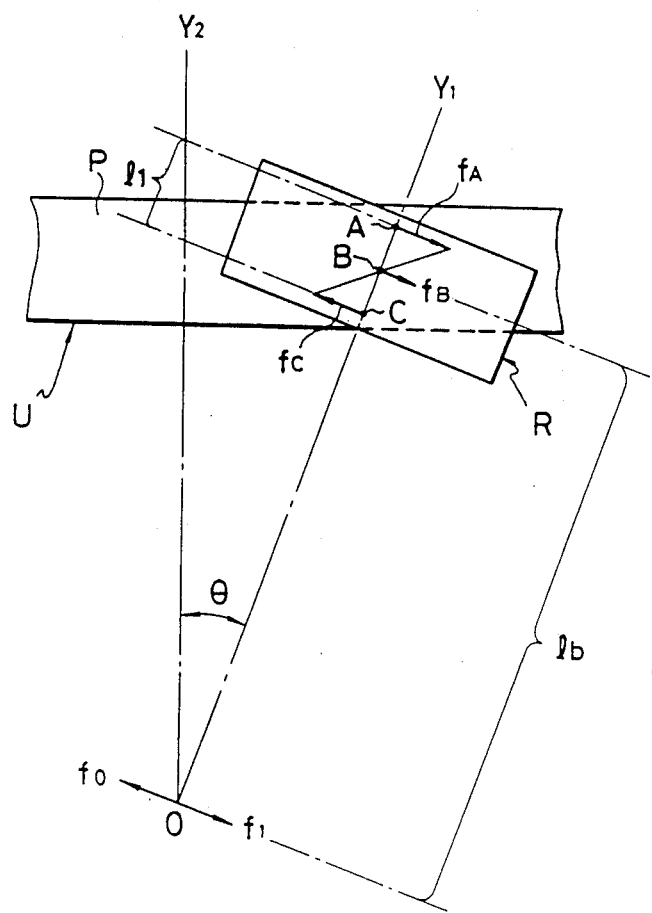
FIG. 5 is a diagram of explaining the operation of a generally used tripod type constant velocity joint.

FIGS. 3 and 4 illustrate the prior art;

FIG. 5 serves to explain the invention; and

Figure 6:
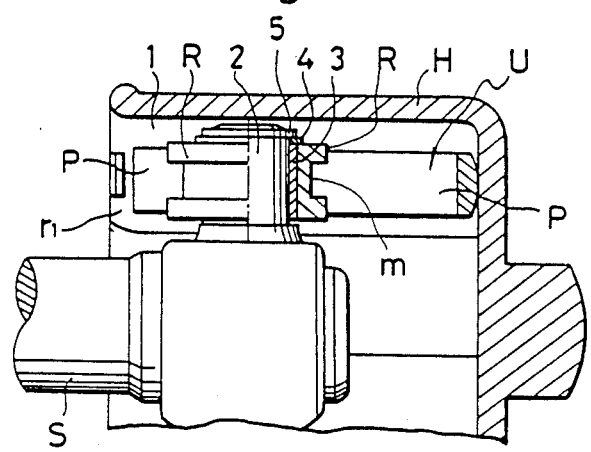
FIG. 6 is a section view of the second embodiment of this invention.

FIG. 6 illustrates a modification of the invention.

Referring to the drawing, the same numerals and symbols in FIG. 3 and FIG. 4 mean the identical parts in these embodiments. $U^1$ and $U_2$ indicate an aligning member means and are fixed inraceway 1 of the housing H as shown in FIG. 1. and in the aligning member means $U^1$, a cylindrical surface $r^2$ is formed in all outer areas. The aligning member means $U^2$ is formed of a discontinuing cylindrical surface $r^2$ in which a cutway part K is cut along the central portion of its outer area.

$P^1$ and $P^1$ are two separate planes formed on the aligning member means $U^1$ and $U^2$ and have function of the contact surfaces with a peripheral 6 (cylindrical surface) of a cylindrical roller R.

The separate planes $P^1$ and $P^1$ are on one same plane and are in parallel in the marginal areas of the width direction of the aligning member means $U^1$ and $U^2$. m is a groove provided between two separate planes $P^1$ and $P^1$. In comparison to a conventional aligning member means of FIG. 4, said two separate planes are formed by a groove m in the central part of the width direction of the plane.

The width of two separate planes $P^1$ and $P^1$ are determined in consideration of the contact pressure, durability etc. Hence the groove m is provided positively to eliminate a contact with a cylindrical roller R and therefore shapes and sizes of the groove are not limited to the embodiment examples. Constructed as above, the peripheral surface 6 of the cylindrical roller R and two separate planes R of the aligning member means $U^1$ and $U^2$ contact each other always in the actual operation of the joint. Furthermore, since in the contacting areas of said peripheral surface 6 and two separate planes $P^1$ and $P^1$, a sliding motion between the cylindrical roller R and $U^1$ and $U^2$ is large, a friction resistance force caused by the sliding motion occurs in this area. Thus explaining in reference to FIG. 5, there occurs a counter force fo at the center O of the joint caused by above friction resistance force and this counter force fo works in the opposite direction of the rolling friction resistance force $f^1$ of the cylindrical roller R and decreases the force $f^1$. In this manner, the influence of the rolling friction resistance force $f^1$ to the axial force is to be decreased and the swaying of vehicle body can be eliminated.

In this embodiment, a groove m is formed on the plane P of the aligning member means, the separate planes $P^1$ and $P^1$ being formed on both sides of the groove, which consist the contact surfaces with he cylindrical surfaces, or in the reverse way, it being possible to have the aligning member means as the plane as it is and form a groove in the central part along the all periphery of a cylindrical roller, providing the cylindrical surfaces to contact with the aligning member means on both sides of the groove as shown in FIG. 6. This has nothing essentially different from the embodiment in the actual operation.

As explained above, according to this invention, the influence of the rolling friction resistance force to the axial force could be reduced by providing a groove in the plane of an aligning member means or in the central part of of the width direction on the periphery of a cylindrical roller, and since the contact is taken place in the areas where the sliding forces between the cylindrical roller and the aligning member means are large, it is possible to reduce the influence of the rolling friction resistance force of the cylindrical roller to the axial force.

What is claimed is:

1. In a tripod type constant velocity joint comprising:
    a housing having three axially extending circumferentially distributed raceways with cylindrical surfaces;
    a shaft having three trunnions extending radially separately into said raceways; and
    a cylindrical roller coaxially rotatably mounted on each of said trunnions, the improvement comprising;
    three U-shaped aligning members, each of which has a pair of circumferentially spaced axially extending arms with cylindrical outer surfaces slidably contacting circumferentially opposed cylindrical surfaces of said raceways, each of said aligning members also having a center section joining the respective arms at one axial end thereof;

the arms of each aligning member having a pair of axially continuous planar inner surfaces in contact with opposite sides of the cylindrical roller that extends into the respective raceway; and means for holding the aligning members in the housing for limited relative movement with respect to the respective raceway;

the planar inner surfaces of each arm being coplanar with one another and being separated by at least one wide continuous axially extending groove free of mechanical elements.

2. The tripod type constant velocity joint of claim 1 wherein said aligning members are of continuous drawn and heat treated steel.

3. The tripod type constant velocity joint of claim 1 wherein each aligning member pinches the respective roller between its axially extending arms to maintain the roller therebetween.

4. The tripod type constant velocity joint of claim 1 wherein the center section of each aligning member comprises a curved continuation of the respective arms, whereby the grooves of said arms are joined by a groove in said center section.

5. The tripod type constant velocity joint of claim 4 wherein said aligning members are formed of drawn and heat treated steel, whereby said planar surfaces have heat treatment distortions and/or imperfections due to manufacturing errors.

6. In a tripod type constant velocity joint comprising:
a housing having three axially extending circumferentially distributed raceways with cylindrical surfaces;
a shaft having three trunnions extending radially separately into said raceways; and
a cylindrical roller coaxially rotatably mounted on each of said trunnions, the improvement comprising;
three drawn and heat treated U-shaped aligning members, each of which has a pair of circumferentially spaced axially extending arms with cylindrical outer surfaces slidably contacting circumferentially opposed cylindrical surfaces of said raceways joined at one end by a curved center section of substantially the same cross section;

the arms of each aligning member having a pair of axially continuous planar inner surfaces in contact with opposite sides of the cylindrical roller that extends into the respective raceway and defining sliding and rolling surfaces for the respective roller; and means for holding the aligning members in the housing for limited relative movement with respect to the respective raceway;

the planar inner surfaces of each arm being coplanar with one another and being separated by at least one wide continuous axially extending groove free of mechanical elements, said grooves reducing the influence of rolling friction resistance on axial forces on said aligning members.

7. In a tripod type constant velocity joint comprising:
a housing having three axially extending circumferentially distributed raceways with cylindrical surfaces;
a shaft having three trunnions extending radially separately into said raceways; and
a cylindrical roller coaxially rotatably mounted on each of said trunnions, the improvement comprising;
three U-shaped aligning members, each of which has a pair of circumferentially spaced axially extending arms with cylindrical outer surfaces slidably contacting circumferentially opposed cylindrical surfaces of said raceways, each of said aligning members also having a center section joining the respective arms at one axial end thereof;

the arms of each aligning member having axially continuous planar inner surfaces in contact with opposite sides of the cylindrical roller that extends into the respective raceway; and means for holding the aligning members in the housing for limited relative movement with respect to the respective raceway;

the surfaces of the rollers and planar inner surfaces of each arm being shaped to permit contact with one another only along a pair of spaced apart axially continuous edge surfaces of said planar inner surfaces.

* * * * *